(12) United States Patent
Bell et al.

(10) Patent No.: US 7,028,574 B1
(45) Date of Patent: Apr. 18, 2006

(54) SLED SYSTEM FOR MOUNTING PARKING BRAKE AND SHIFT ASSEMBLIES

(75) Inventors: Larry W. Bell, Canton, MI (US); John G. Thomas, Livonia, MI (US); Robert N. Maley, Fraser, MI (US); Derrick Dysart, Southfield, MI (US); Richard L. Kelley, Royal Oak, MI (US); E. Mackey King, Brighton, MI (US)

(73) Assignee: DaimlerChrysler Corporation, Auburn Hills, MI (US)

( * ) Notice: Subject to any disclaimer, the term of this patent is extended or adjusted under 35 U.S.C. 154(b) by 0 days.

(21) Appl. No.: 09/373,038

(22) Filed: Aug. 12, 1999

(51) Int. Cl.
*B60K 20/04* (2006.01)

(52) U.S. Cl. ............... 74/473.15; 74/473.3; 296/37.14; 180/315; 180/89.1; 180/336

(58) Field of Classification Search ............... 180/315, 180/90, 90.6, 89.1, 336, 344; 296/37.8, 193, 296/37.12, 37.14; 74/473.3, 500.5, 501.6, 74/502, 543, 544, 473.15
See application file for complete search history.

(56) References Cited

U.S. PATENT DOCUMENTS

| | | | | | |
|---|---|---|---|---|---|
| 4,077,276 | A | * | 3/1978 | Knox, Jr. ..................... | 74/475 |
| 4,548,093 | A | * | 10/1985 | Nomura et al. ............... | 74/512 |
| 4,548,094 | A | * | 10/1985 | Huitema et al. .............. | 74/526 |
| 4,690,241 | A | * | 9/1987 | Miyadera .................... | 180/315 |
| 4,864,886 | A | * | 9/1989 | Burgei .......................... | 74/536 |
| 5,335,751 | A | * | 8/1994 | Kuroki ....................... | 180/336 |
| 5,857,726 | A | * | 1/1999 | Yokoyama et al. ........... | 296/70 |
| 5,887,485 | A | * | 3/1999 | VanOrder et al. ......... | 74/473.15 |
| 5,924,333 | A | * | 7/1999 | Futschik et al. .............. | 74/566 |
| 5,970,814 | A | * | 10/1999 | Smith et al. ............. | 74/473.15 |
| 6,000,296 | A | * | 12/1999 | Sundquist ................ | 74/473.12 |
| 6,086,129 | A | * | 7/2000 | Gray ........................ | 296/37.8 |

* cited by examiner

*Primary Examiner*—J. Allen Shriver
(74) *Attorney, Agent, or Firm*—Ralph E. Smith

(57) ABSTRACT

A sled system for mounting a parking brake hand lever assembly and a gear shift assembly to a vehicle floor pan, the sled system having a predetermined configuration to mount on a vehicle floor pan.

17 Claims, 3 Drawing Sheets

SLED SYSTEM FOR MOUNTING PARKING BRAKE AND SHIFT ASSEMBLIES

TECHNICAL FIELD

This invention relates generally to the mounting of a parking brake and shift assemblies, and more particularly to a sled system for accomplishing same.

DISCUSSION

Motor vehicle technology has evolved to provide the option of mounting various assemblies in different locations within the vehicle. In a sport utility vehicle for example it is preferred to mount the transfer case shift lever assembly, the parking brake hand lever assembly and the gear shift lever assembly in a center console position for ease of operation by the driver. In order to accomplish this the assemblies are generally mounted to the vehicle floor pan.

Under conventional methods, the vehicle floor pan is generally comprised of a stamping that is reinforced by various methods in order to accommodate mounting of various assemblies and fixtures directly to the floor pan. Under the state of the art, a single floor pan is supplied for both manual and automatic transmissions. In order to accommodate a manual or an automatic transmission shift lever assembly, the floor pan is constructed with the appropriate configuration, including the appropriate apertures and fasteners to accomplish this. In doing so, in the instance when one or the other transmission assembly is installed, there are necessarily fasteners and/or apertures that are not utilized. This results in several negative limitations including increased cost involved in fabricating a floor pan with fasteners and/or apertures that are not utilized and fabricating the floor pan in a configuration that can accept either assembly. Additionally, the floor pan must be constructed with added reinforcement in order to accommodate the stresses and strains involved in operating the assemblies. In providing a floor pan that can accommodate both manual and automatic transmissions, limitations in installation exist in that line workers come in contact with the redundant fasteners resulting in reduced ergonomics. In addition, when apertures are not utilized this results in the potential intrusion of water as well as the possibility of noise, vibration and harshness (NVH) problems in the vehicle. These limitations, unless compensated for, may result in complaints from the end user.

It is therefore desirable to provide a system which can alleviate the above-referenced negative limitations.

SUMMARY OF THE INVENTION

Accordingly, it is an object of the present invention to provide a sled system to accommodate an automatic or a manual transmission without the redundancies of fasteners and/or apertures that are not utilized.

It is a further object of the present invention to provide a sled system for assembly off site as a module for installation into a motor vehicle.

It is a further object of the present invention to provide a sled system that is sufficiently rigid thereby removing the necessity for reinforcement in the floor pan.

It is a further object of the present invention to provide a sled system that can accommodate a NVH and water barrier.

It is a further object of the present invention to provide a sled system that provides a harmonious environment for dimensional control.

These and other objects are obtained by providing a sled system having a sled with a predetermined configuration, the sled being adapted to fit onto a vehicle floor pan, the sled having a plurality of openings for accepting at least one assembly, the assembly being disposed within an opening in the sled and mounted to the sled by a plurality of fasteners.

BRIEF DESCRIPTION OF THE DRAWINGS

In order to appreciate the manner in which the advantages and objects of the invention are obtained, a more particular description of the invention will be rendered by reference to specific embodiments thereof which are illustrated in the appended drawings. Understanding that these drawings only depict an illustrated embodiment of the present invention and are not therefore to be considered limiting in scope, the invention will be described and explained with additional specificity and detail through use of the accompanying drawings in which.

DETAILED DESCRIPTION OF THE PREFERRED EMBODIMENTS

Figure 1:
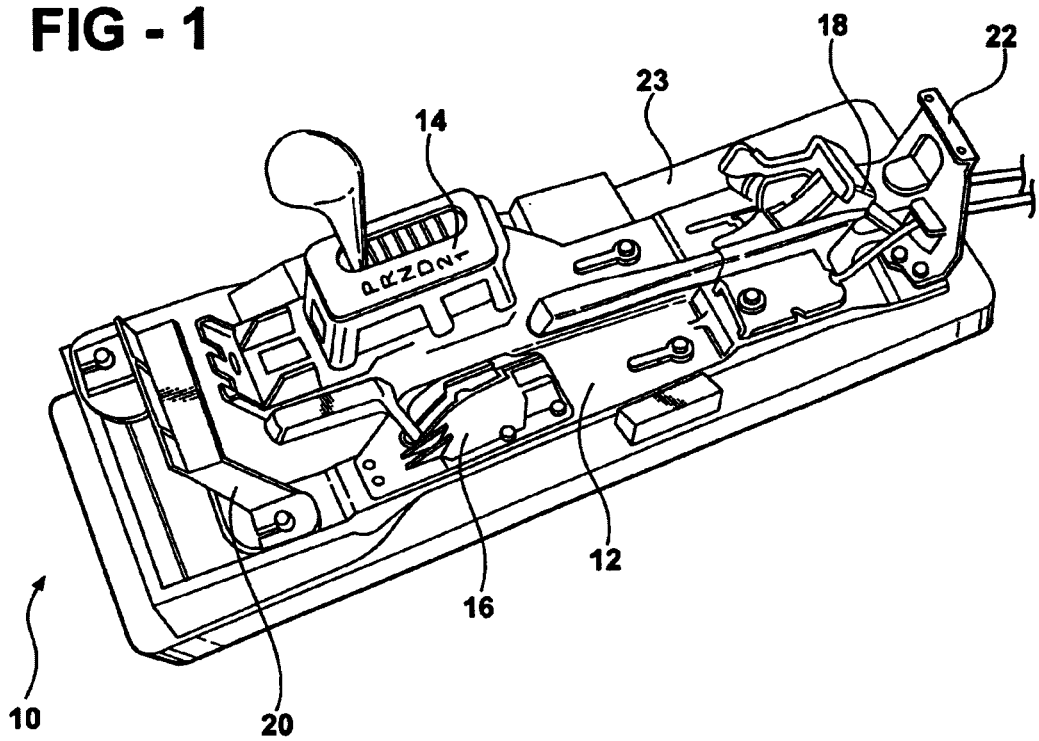
FIG. 1 is a perspective view of the sled system according to the principles of the present invention.

The present invention is directed toward a sled system 10 for mounting a parking brake shift lever and other shift assemblies within a passenger compartment of a vehicle as illustrated in FIG. 1. The sled system 10 has multiple applications depending on the intended use. For purposes of description of the illustrated embodiments, the sled system 10 will be detailed for use in a sport utility vehicle. The present invention as hereinafter detailed should not be interpreted as limiting the breadth of potential uses in other vehicles or in other commercial fields of endeavor for other intended purposes.

The sled system 10 in accordance with the illustrated embodiment of FIG. 1 has a gear shift assembly 14, a parking brake hand lever assembly 18 and a transfer case shifter assembly 16 mounted to a sled 12. The gear shift assembly 14, the parking brake hand lever assembly 18 and the transfer case shifter assembly 16 are known in the art. The sled 12 has further mounted to it in a forward position to the gear shifter assembly 14, an instrument panel (I/P) mounting bracket 20, and in a rearward position to the parking brake assembly 18 a console mounting bracket 22.

In the environment of a sport utility vehicle, the sled 12 is mounted onto a floor pan 23 (a portion of which is shown) of the sport utility vehicle during assembly of the vehicle. The advantage over conventional methods is that the floor pan can be of a singular design, without the necessity to accommodate both an automatic and a manual transmission assembly. By incorporating the necessary complexity into the sled 12 to accommodate various assemblies, the sled system 10 as assembled in a vehicle has the advantage over the prior art of reduced cost and increased efficiency. Additionally, the sled 12 has the advantage of allowing for the reduction of NVH and the intrusion of water without added extra measures being required at additional expense. Also, the sled 12 has the advantage of allowing for greater rigidity during operation of the gear shift assembly 14, the parking brake hand lever assembly 18 and the transfer case shifter assembly 16. As such, by incorporating the necessary rigidity into the sled 12 the removal of reinforcements from the floor pan is accomplished which translates into a cost savings.

By use of the sled 12 a line worker is not confronted with the necessity of coming into contact with fasteners that are not utilized during installation of various assemblies. The sled 12 also has the further advantage of having the gear shift assembly 14, the parking brake assembly 18 and the transfer case shifter assembly 16 being installed onto the sled 12 before the sled 12 is mounted into a vehicle. Therein the sled system 10 has the further advantage of being assembled off site and being introduced into the vehicle as a module.

Figure 2:
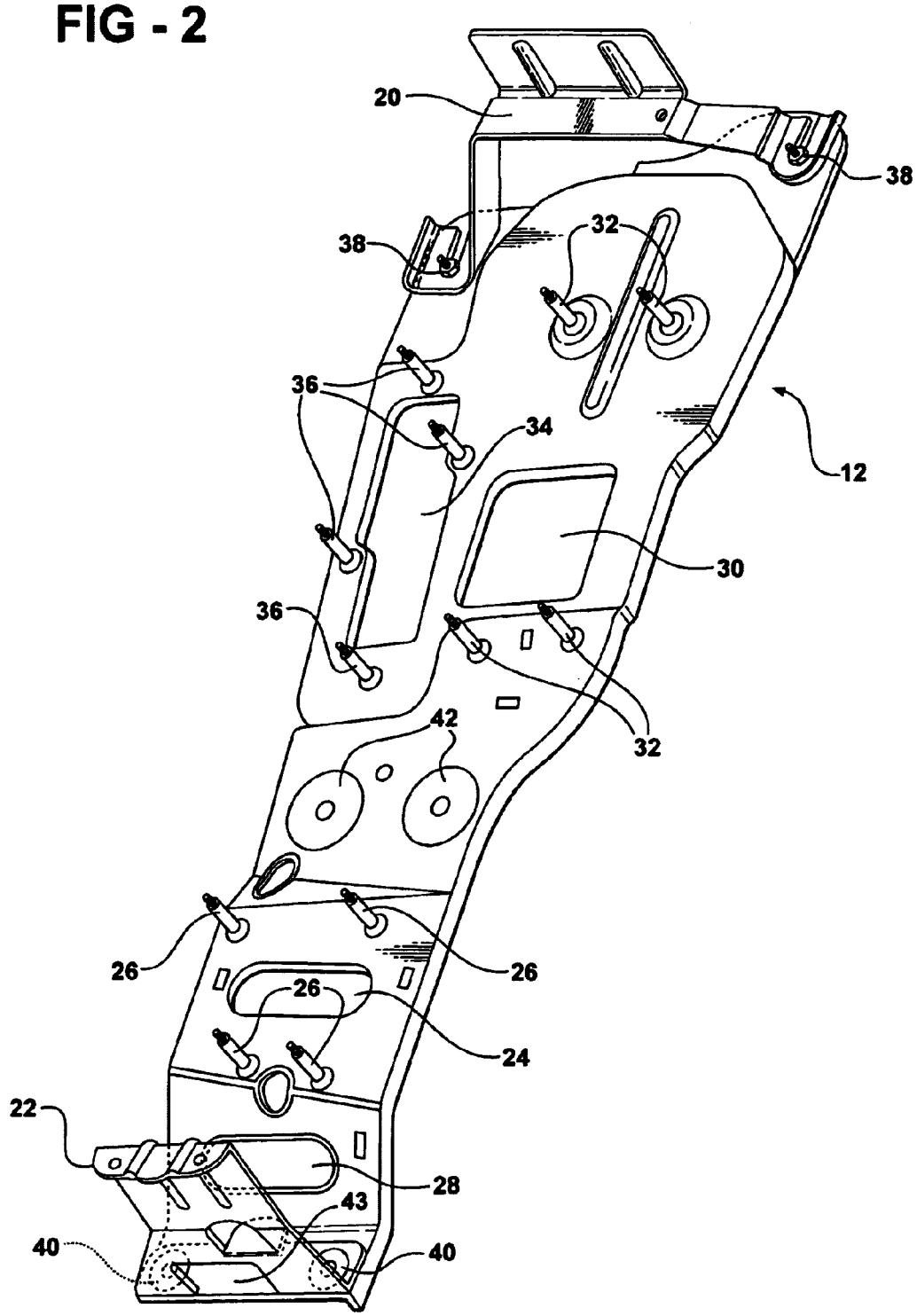
FIG. 2 is a top view of the sled according to the principles of the present invention.
Figure 3:
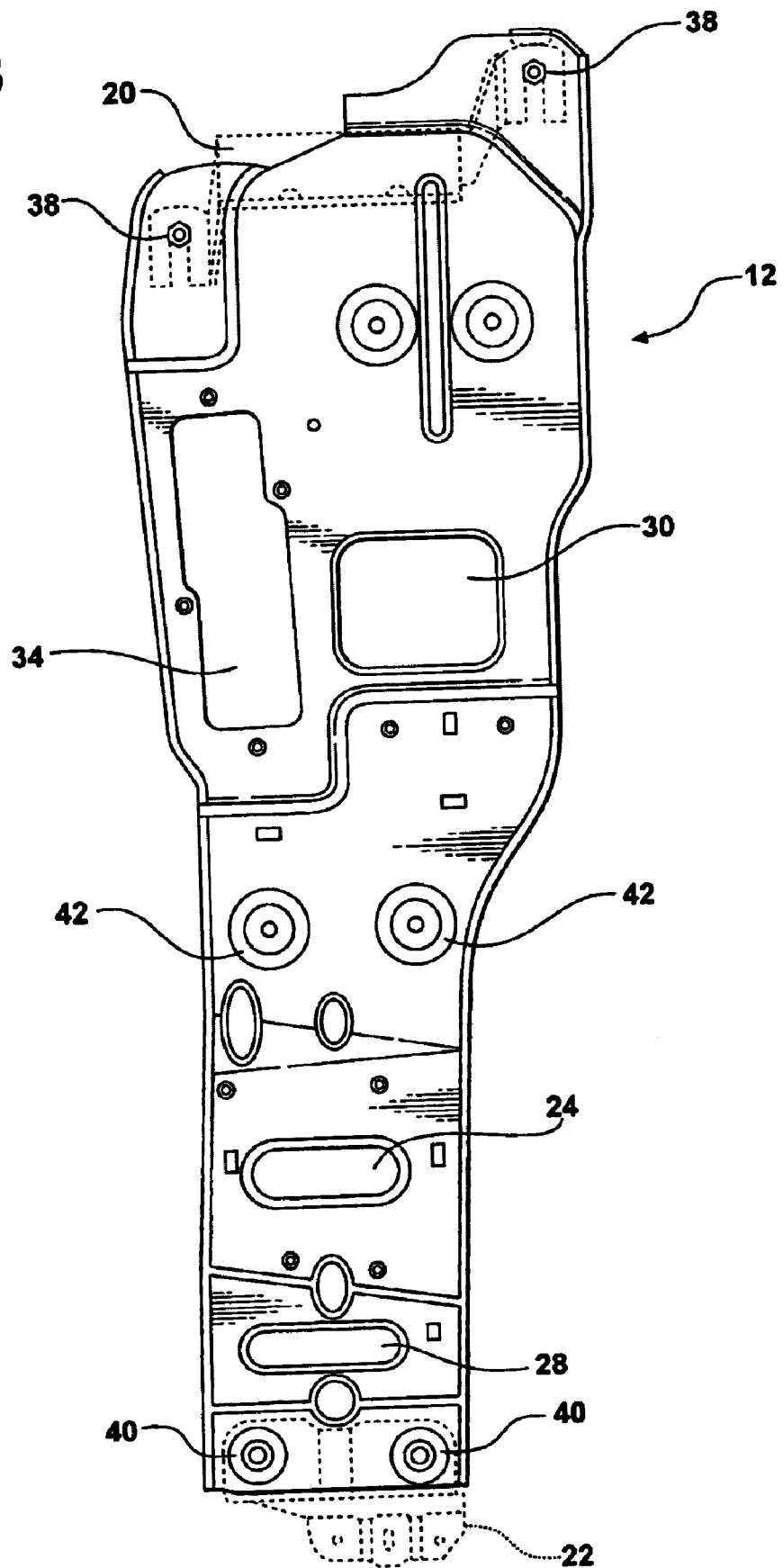
FIG. 3 is a bottom view of the sled according to the principles of the present invention.

Turning to FIGS. 2 and 3, an illustrated embodiment of the sled 12 is shown. The sled 12 is shaped to mate with the floor pan 23 (a portion of which is shown) of a vehicle. The sled 12 has a gear shift aperture 30 that is designed and positioned in the sled 12 to accept the gear shift assembly 14 such that placement of the gear shift assembly 14 into the gear shift aperture 30 results in the gear shift assembly 14 being in operable communication with the shift assembly operating cable (not shown) of the vehicle. In placement of the gear shift assembly 14 into the gear shift aperture 30, the gear shift assembly 14 comes in contact with gear shift fasteners 32 that are disposed on sled 12 in a predetermined configuration in order to mate with accepting orifices of a mounting flange portion of the gear shift assembly 14 (not shown) such that the gear shift assembly 14 can be fixedly mounted into position on the sled 12.

Returning to FIGS. 2 and 3, the sled 12 has a transfer case shifter aperture 34 located in a position adjacent to the gear shift aperture 30 on the sled 12. The transfer case aperture 34 is positioned and adapted to accept a transfer case shifter assembly 16 such that a transfer case shifter assembly 16 when disposed within the transfer case aperture 34 is in operable communication with the transfer case operating cable (not shown) of the vehicle. The sled 12 further contains transfer case fasteners 36 which are positioned about the transfer case aperture 34 in a manner such that when the transfer case shifter assembly 16 is disposed within the transfer case aperture 34, accepting orifices in a mounting flange portion of the transfer case shifter assembly 16 accept the transfer case fasteners 36 such that the transfer case shifter assembly 16 can be fixed by way of the transfer case fasteners 36 to the sled 12.

Returning to FIGS. 2 and 3, the sled 12 has in a position rearward to the gear shift aperture 30 and the transfer case aperture 34 a parking brake hand lever aperture 24, and in a more rearward position a parking brake cable access aperture 28. The parking brake aperture 24 is designed and positioned to accept a parking brake hand lever assembly 18 such that when the parking brake hand lever assembly 18 is disposed within the parking brake aperture 24, the parking brake hand lever assembly 18 is in operable communication with a parking brake cable of the parking brake system of the vehicle. The parking brake aperture 24 has disposed around it parking brake fasteners 26 which are positioned such that when the parking brake assembly 18 is disposed within the parking brake aperture 24, accepting orifices in a mounting flange portion of the parking brake assembly 18 mate with the parking brake fasteners 26 such that the parking brake assembly 18 is fixed to the sled 12. In mounting the parking brake assembly 18 to the sled 12, a brake cable extends from the parking brake assembly 18 to the vehicle, through the parking brake cable axis port 28 and a parking brake cable port 43.

Returning to FIGS. 2 and 3, the sled 12 has in a forward position to the gear shift aperture 30 and the transfer case shifter aperture 34 an instrument panel (I/P) mounting bracket 20. The sled 12 has in a rearward position to the parking brake cable access aperture 28 a console mounting bracket 22. It should be understood that the I/P mounting bracket 20 and the console mounting bracket 44 are optional and may be attached to the sled 12 by a variety of methods. The sled 12 is fixedly mounted in position onto the floor pan 23 of a vehicle via fasteners that are accepted by front orifices 38, middle orifices 42 and rear orifices 40 of the sled 12. Additionally, when the sled system 10 is mounted in position, I/P mounting bracket 20 is used to mount to the instrument panel, and the console mounting bracket 22 is used to mount the console to the sled 12.

It should be understood that the sled 12 can have various shapes in order to mate with a particular vehicle floor pan. Additionally, the sled 12 can vary in the placement, the position and design of apertures. Also, the sled 12 can vary in the existence of apertures, and in the existence and placement of fasteners. It should also be understood that the sled 12 may also be configured with or without the assemblies as shown in the illustrated embodiments including the removal of the transfer case shifter assembly 16, the parking brake assembly 18 or the gear shift assembly 14, or any combination thereof. Finally, it should be understood that the I/P mounting bracket 20 and the console bracket 22 may have a variety of configurations, and may or may not be included individually or together on the sled 12.

Figure 4:
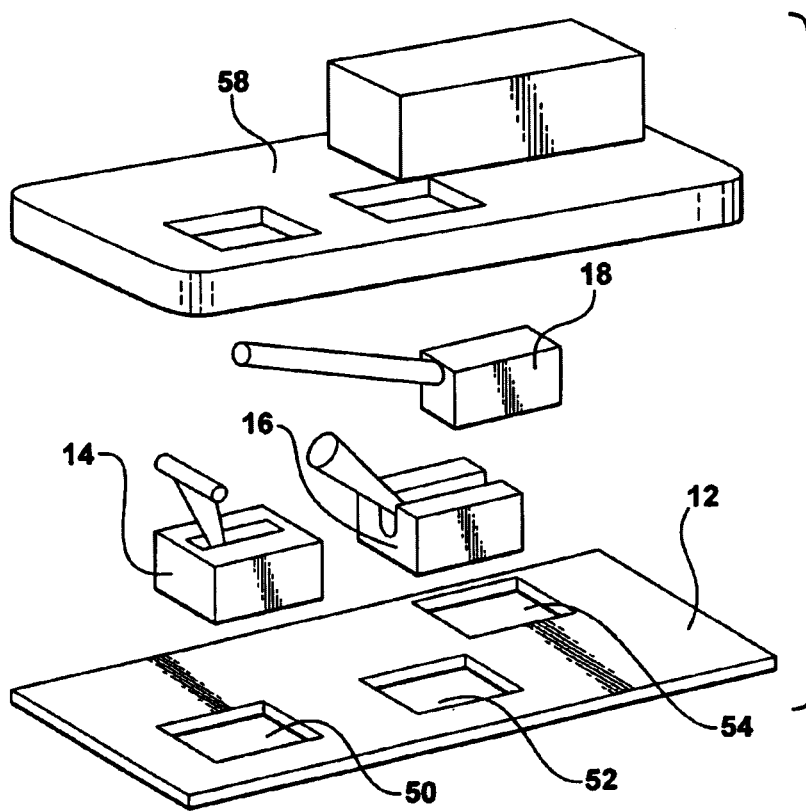
FIG. 4 is a schematic diagram of the sled system for mounting a parking brake and shift assemblies according to the principles of the present invention.

Turning to FIG. 4, the block diagram illustrates alternate embodiments of the sled system 10 wherein the sled 12 has a gear shift portion 50, a transfer case portion 52 and a parking brake portion 54, wherein a gear shift assembly 14, of either a manual or automatic type, is disposed and mounted in the gear shift portion 50, a transfer case shifter assembly 16 is disposed and mounted in the transfer case portion 52 and a parking brake hand lever assembly 18 is disposed and mounted in the parking brake portion 54. A console 58 is mounted to the sled 12 via the console mounting bracket 22. It will be understood that any combination of the gear shift portion 50, the transfer case portion 52 and the parking brake portion 54 may be used. It will also be understood that the gear shift portion 50, the transfer case portion 52 and the parking brake portion 50 will have an appropriate configuration, including the position and shape of apertures and the inclusion and position of fasteners in order to accommodate the disposition and placement of an assembly in an appropriate position in relation to a vehicle. In operation, following mounting of sled system 10 either as a module or assembled within the vehicle movement of an appropriate lever operates an appropriate system in the vehicle resulting in an appropriate response.

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, specification and the following claims.

What is claimed is:

1. A sled for mounting a shift assembly to a vehicle comprising:
   a first surface;
   a second surface formed on an opposite side of the sled from said first surface and opposing a floor pan of the vehicle;
   a first aperture receiving a gear shift assembly including a first operating cable, said first operating cable extending between said second surface and said floor pan and attached to a shift lever operating cable of the vehicle;

a second aperture receiving a transfer case shift assembly including a second operating cable, said second operating cable extending between said second surface and said floor pan and attached to a transfer case operating cable of the vehicle; and a third aperture receiving a brake lever assembly including a third operating cable, said third operating cable extending between said second surface and said floor pan and attached to a brake lever operating cable of the vehicle.

2. The sled according to claim 1, wherein said gear shift assembly is an automatic transmission gear shift assembly.

3. The sled according to claim 1, wherein said gear shift assembly is a manual transmission gear shift assembly.

4. The sled according to claim 1, further comprising a console mounting bracket mounted to said first surface of the sled.

5. The sled according to claim 4, further comprising a console member mounted to said console mounting bracket.

6. The sled according to claim 1, further comprising an instrument panel mounting bracket mounted to said first surface of the sled.

7. The sled according to claim 1, wherein said sled system is assembled as a module.

8. The sled according to claim 1, further comprising a plurality of fasteners that fix the gear shift assembly, transfer case shift assembly, and brake lever assembly to the sled.

9. The sled according to claim 8, wherein each of said gear shift assembly, said transfer case shift assembly, and said brake lever assembly include a flange for receiving said fasteners.

10. The sled according to claim 1, further comprising mounting holes utilized to mount the sled to said floor pan.

11. A method comprising:

mounting a gear shift assembly to a sled;

mounting a transfer case shift assembly to said sled;

mounting a brake lever assembly to said sled;

attaching a first operating cable of said gear shift assembly to a gear shift operating cable of a vehicle between said sled and a floor pan of said vehicle;

attaching a second operating cable of said transfer case shift assembly to a second operating cable of said vehicle between said sled and said floor pan;

attaching a third operating cable of said brake lever assembly to a third operating cable of said vehicle between said sled and said floor pan; and mounting said sled to said floor plan.

12. The method of claim 11, wherein said mounting said gear shift assembly includes engaging fasteners with a flange of said gear shift assembly and said sled.

13. The method of claim 11, wherein said mounting said gear shift assembly includes positioning said gear shift assembly within a first aperture of said sled.

14. The method of claim 11, wherein said mounting said transfer case assembly includes engaging fasteners with a flange of said transfer case assembly and said sled.

15. The method of claim 11, wherein said mounting said transfer case assembly includes positioning said transfer case assembly within a second aperture of said sled.

16. The method of claim 11, wherein said mounting said brake lever assembly includes engaging fasteners with a flange of said brake lever assembly and said sled.

17. The method of claim 11, wherein said mounting said brake lever assembly includes positioning said brake lever assembly within a third aperture of said sled.

* * * * *

UNITED STATES PATENT AND TRADEMARK OFFICE
CERTIFICATE OF CORRECTION

PATENT NO. : 7,028,574 B1
APPLICATION NO. : 09/373038
DATED : April 18, 2006
INVENTOR(S) : Bell et al.

Page 1 of 1

It is certified that error appears in the above-identified patent and that said Letters Patent is hereby corrected as shown below:

On Title Page:

Item (75) Inventors:   Larry W. Bell, Canton, MI (US)
John G. Thomas, Livonia, MI (US)
Robert N. Maley, Fraser, MI (US)
Derrick Dysart, Southfield, MI (US)
Richard L. Kelley, Royal Oak, MI (US)
E. Mackey King, Brighton, MI (US)

*Should include: Mark J. Ballo, Royal Oak, MI (US)*

Signed and Sealed this

First Day of August, 2006

JON W. DUDAS
*Director of the United States Patent and Trademark Office*